(12) United States Patent
Scherzer et al.

(10) Patent No.: US 7,655,705 B2
(45) Date of Patent: Feb. 2, 2010

(54) OPEN-CELL FOAM COMPOSED OF HIGH-MELTING POINT PLASTICS

(75) Inventors: Dietrich Scherzer, Neustadt (DE); Hanns-Jörg Krautschneider, Neustadt (DE); Franz-Josef Dietzen, Hassloch (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 519 days.

(21) Appl. No.: 10/784,815

(22) Filed: Feb. 24, 2004

(65) Prior Publication Data

US 2004/0167241 A1 Aug. 26, 2004

(30) Foreign Application Priority Data

Feb. 24, 2003 (DE) ................. 103 07 736

(51) Int. Cl.
*C08J 9/04* (2006.01)
*B29C 44/00* (2006.01)

(52) U.S. Cl. .............. 521/134; 521/138; 521/139; 521/79; 521/81; 264/50; 264/53

(58) Field of Classification Search ............ 521/155, 521/162, 79, 134, 138, 139, 81; 264/50, 264/53
See application file for complete search history.

(56) References Cited

U.S. PATENT DOCUMENTS

| | | | | |
|---|---|---|---|---|
| 4,308,352 A | * | 12/1981 | Knaus | 521/79 |
| 4,629,745 A | * | 12/1986 | Hoki et al. | 521/87 |
| 4,943,594 A | * | 7/1990 | Ezawa et al. | 521/79 |
| 5,017,622 A | * | 5/1991 | Bland et al. | 521/79 |
| 5,084,484 A | * | 1/1992 | Nintz et al. | 521/97 |
| 6,045,899 A | * | 4/2000 | Wang et al. | 428/315.7 |
| 6,077,600 A | | 6/2000 | Atmur et al. | |
| 7,045,082 B2 | * | 5/2006 | Dietzen et al. | 264/50 |

FOREIGN PATENT DOCUMENTS

| | | | |
|---|---|---|---|
| DE | 100 08 461 A | | 5/1957 |
| DE | 4200311 | * | 7/1993 |
| DE | 42 07 057 | | 9/1993 |
| EP | 296 408 | | 12/1988 |
| EP | 373 402 | | 6/1990 |
| EP | 1333051 | * | 6/2003 |
| JP | 05262910 A | * | 10/1993 |
| WO | WO 02/00275 | | 1/2002 |

OTHER PUBLICATIONS

BASF Ultrason S3010 PSU MatWeb Material Propertiy D, available online 2005.*
BASF Ultrason S2010 PSU MatWeb Material Propertiy D, available online 2005.*
Derwent 93-28232/37.

* cited by examiner

*Primary Examiner*—Irina S Zemel
(74) *Attorney, Agent, or Firm*—Novak Druce + Quigg LLP

(57) ABSTRACT

The present invention relates to an open-cell foam, and to a process for producing this open-cell foam by melting a thermoplastic, or a mixture comprising a thermo-plastic, giving a melt, mixing the melt with at least one blowing agent under pressure, and foaming the melt comprising the blowing agent via extrusion into the free atmosphere, the temperature of the melt during the foaming process being greater than the melt temperature at which a closed-cell foam is formed, and/or adding a pulverulent solid, and/or adding a foreign polymer. The present invention further relates to the use of the foam of the invention for sound deadening or for producing materials by sound deadening.

21 Claims, No Drawings

OPEN-CELL FOAM COMPOSED OF HIGH-MELTING POINT PLASTICS

The present invention relates to an open-cell foam, and also to a process for its production. The present invention further relates to the use of this foam for sound deadening, and to the production of materials for sound deadening. The present invention also relates to a process for influencing the open-cell content, and the density, of foams.

Foams are materials which have open and/or closed cells distributed across their entire bulk, and which have an envelope density lower than that of the structural substance. The structural substance may either be organic polymers or else be inorganic materials. Foams whose structural substance comprises organic polymers are called foamed plastics, whereas foams which comprise inorganic materials are referred to as expanded concrete or foamed glass.

The excellent properties of foamed plastics—low density, good properties for sawing or cutting processes, good thermal insulation and good sound deadening—have given them great importance in a very wide variety of fields of engineering and commerce. Polyurethane foams, followed by polystyrene foams, currently have the greatest importance in industry.

There are various ways of producing foams from polymers. The starting material is mostly finished polymers, these being treated in various ways with blowing agents, and then foamed. For this, the blowing agent may be admixed under pressure with the molten polymer, and the mixture then depressurized with cooling, or the solid polymer may be impregnated at low temperature with the blowing agent, the composition then being foamed by increasing the temperature. It is also possible to inject permanent gases directly into a polymer in fluid form—mostly latices—and stabilize the resultant cream-like foam. Polymers which cannot be melted can be converted into foams via sintering processes, or by extraction of a finely distributed soluble second phase. Foams can also be produced during the synthesis of the polymers if this process eliminates gaseous constituents.

The direct gas injection process deserves particular mention. In the direct gas injection process, the plastic is melted in a first extruder, or in a first extruder zone, and the melt is mixed under high pressure with a blowing agent, and then cooled. During depressurization of the cooled melt at the extrusion die, the material foams and hardens to give a foam. The hardening process is accelerated firstly by the cooling brought about by vaporization of the blowing agent, and secondly by the fall-off in the plasticizing action of the blowing agent as it evaporates. This process has been known for a long time, and is described by way of example in the patent applications DE-A 42 07 057, EP-A 0 296 408, and EP-A 0 373 402.

DE-A 42 07 057 describes high-melting-point aromatic plastics which contain aromatic systems bonded by way of ethereal oxygen atoms and by way of carbonyl groups, sulfone groups, or imide groups. These plastics are extrusion-foamed in a direct gas injection process, using an oxygen-containing aliphatic blowing agent. In this process, the plastic is melted, and, at above the glass transition temperature of the pure plastic, the melt is mixed under pressure with a blowing agent. The mixture is cooled, while maintaining the pressure, to below the melting point of the pure plastic, to a temperature at which it remains molten. The cooled mixture is then foamed by depressurization. The foams resulting from this process have a closed-cell structure.

EP-A 0 296 408 describes a process for producing an extruded and foamed product which encompasses a thermoplastic engineering resin alone or in combination with an aromatic alkenyl polymer and with a blowing agent, the blowing agent being substantially insoluble in the resin at room temperature but dissolving in the melt in the extruder. The foamed product is again produced by the direct gas injection process. The foam of EP-A 0 296 408 has a closed-cell structure.

EP-A 0 373 402 relates to extensible foams composed of thermoplastic polyether-imide resin compositions provided with dissolved oxygen-containing hydrocarbon blowing agents. These foams are again produced by the direct gas injection process, and have a closed-cell structure.

However, in many applications of foams it is advantageous for the structure of the foams to be open-cell. This is particularly advantageous when the foams concerned are used for sound deadening.

Examples of uses of foams for sound deadening are found in the engine compartment of vehicles. Here, high-temperature-resistant foams are needed for sound deadening, because high temperatures usually prevail in engine compartments. The foams used hitherto in these areas are exclusively thermosets. Thermosets are cured plastics produced from curable resins and undergoing only minimal alteration when exposed to temperature changes. Thermosets are highly polymeric materials which retain close-meshed crosslinking up to their decomposition temperature, and which at low temperatures are energy-elastic and even at high temperatures do not have viscous flow, but between 50° C. or a higher temperature or the decomposition temperature behave elastically with very limited deformability.

A disadvantage with the use of thermosets is that they cannot be recycled after their use.

It is therefore desirable to provide a foam composed of a thermoplastic which is high-temperature-resistant and open-cell, and which can be recycled after its use.

It is an object of the present invention, therefore, to provide foams which have very good suitability for sound deadening, are resistant to high temperatures, and can be recycled.

We have found that this object is achieved by way of a foam composed of a high-temperature-resistant thermoplastic.

A feature of the high-temperature-resistant thermoplastic of the invention is that the foam has an open-cell structure.

According to the invention, thermoplastics are plastics which are soft or hard materials at the service temperature, and which have a flow transition region above the service temperatures. Thermoplastics differ from thermosets in that they can be recycled without difficulty.

For the purposes of the present invention, high-temperature-resistant plastics are plastics which are suitable for use at high temperatures, in particular at temperatures generally above 150° C., preferably above 180° C., particularly preferably above 200° C.

The foams of the invention have excellent sound-deadening properties, even at high temperatures.

The foams of the invention are two-phase systems composed of high-temperature-resistant thermoplastics and gases which have been distributed in the form of numerous bubbles forming cells within the polymer matrix. The gas cells within the foams of the invention have connections to each other, and this is therefore an open-cell foam.

The cell size of the foam of the invention is generally from 50 to 2000 µm, preferably from 100 to 1000 µm, particularly preferably from 100 to 800 µm. The foam of the invention also generally has a density of from 20 to 200 g/l, preferably from 20 to 150 g/l, particularly preferably from 30 to 100 g/l. The density here is determined to DIN 53420, and the cell size by measuring the cells under a microscope.

The open-cell factor for the foam is generally at least 75%, preferably at least 85%, particularly preferably at least 90%. The open-cell factor is determined to DIN ISO 4590.

This foam of the invention is generally composed of a plastic selected from the group consisting of polyetherimides, polyether sulfones, polysulfones, polyether ketones, polyether ether ketones, polyether ketone ketones, polyethersulfonamides, and mixtures of these. In one particular embodiment, the plastic is selected from the group consisting of polyetherimides, polyether sulfones, and polysulfones. In another preferred embodiment, the high-temperature-resistant thermoplastic has aromatic units, in particular phenylene groups. These aromatic units generally have bonding via ketone groups, sulfone groups, or imide groups. In one very particularly preferred embodiment, the materials are polyetherimides, polyether sulfones, or polysulfones having aromatic units. Polyether sulfone 3010 E (BASF) is an example of a preferred plastic.

The plastic from which the foams of the invention are formed generally has a glass transition temperature above 170° C., preferably above 180° C., particularly preferably above 200° C.

In one preferred embodiment of the present invention, the plastic of which the foam of the invention is composed is extrudable only above 280° C., preferably only above 300° C., particularly preferably only above 320° C.

Plastics which have the above properties are usually termed high performance plastics.

Where appropriate, the foam of the invention may additionally comprise nucleating agents. Nucleating agents generally serve to control the number of cells in the foam. They therefore bring about the production of a large number of pores at the start of the foaming process, and contribute to a fine and uniform pore structure. A wide variety of additives can serve here as nucleating agents, for example small amounts (e.g. from 0.2 to 2% by weight, based on the plastic) of fine-particle solids which cannot be melted under the process conditions, e.g. silica gel. Other additives which may be present in the foam of the invention, where appropriate, are those which serve to improve flame retardancy (flame retardants), an example being zinc borate, or other processing aids.

The present invention also provides a process for producing an open-cell foam, by melting a thermoplastic or a mixture comprising a thermoplastic, giving a melt, mixing the melt with at least one blowing agent under pressure, and foaming the melt comprising the blowing agent by extrusion into the open atmosphere, which comprises carrying out the foaming at a melt temperature which is higher, by from 2 to 20° C., preferably from 2 to 12° C., particularly preferably from 2 to 10° C., than the temperature at which a closed-cell foam is formed (variant A).

Another embodiment of the present invention provides a process for producing an open-cell foam, by melting a thermoplastic or a mixture comprising a thermoplastic, giving a melt, mixing the melt with at least one blowing agent under pressure, and foaming the melt comprising the blowing agent by extrusion into the open atmosphere, which comprises using a foaming plastic which comprises a pulverulent solid which acts as cell-opener, and comprises carrying out the foaming at a melt temperature which is higher, by from 2 to 12° C., preferably from 2 to 10° C., particularly preferably from 2 to 8° C., than the temperature at which a closed-cell foam is formed (variant B).

Another embodiment of the present invention provides a process for producing an open-cell foam, by melting a thermoplastic or a mixture comprising a thermoplastic, giving a melt, mixing the melt with at least one blowing agent under pressure, and foaming the melt comprising the blowing agent by extrusion into the open atmosphere, which comprises using a foaming plastic which comprises a foreign polymer which acts as cell-opener, and which permits the product of the open-cell foam at foaming temperatures at which a closed-cell foam would otherwise be produced (variant C).

It is also possible to produce open-cell foams by combining the abovementioned processes. For example, the foaming may take place when the temperature of the melt is higher by from 2 to 20° C., preferably from 2 to 12° C., particularly preferably from 2 to 10° C., than the temperature at which a closed-cell foam is formed, at least one pulverulent solid and/or at least one foreign polymer being added to the melt during the process. It is also possible to carry out the process at temperatures at which the closed-cell foam is normally formed, and to add at least one pulverulent solid and/or at least one foreign polymer to the melt. The foams of the invention are preferably produced by adding at least one pulverulent solid and/or at least one foreign polymer. Particular preference is therefore generally given to a combination of variants B and C.

The invention therefore provides the use of a high-temperature-resistant thermoplastic in a direct gas injection process of the prior art, where an increase in the temperature and/or addition of a pulverulent solid and/or addition of a foreign polymer is used to bring about an open-cell structure in the resultant foam.

Variants A-C of the process of the invention here are generally carried out in an extruder.

The open-cell foams of the invention may be obtained via the processes mentioned or via combinations of the processes mentioned.

Variant A:

In order to bring about an open-cell structure in the foam obtainable by the process of the invention, the temperature of the melt during foaming is higher, by from 2 to 20° C., preferably from 2 to 12° C., particularly preferably from 2 to 10° C., than the temperature at which a closed-cell foam is formed.

According to the invention, it has been found that the open-cell factor increases with temperature within a narrow temperature range. However, if the temperature rises above a certain value, the foam then collapses. According to the invention, therefore, an open-cell foam is obtained only if the temperature lies within this very narrow temperature range of higher by from 2 to 20° C., preferably from 2 to 12° C., particularly preferably from 2 to 10° C., than the temperature at which a closed-cell foam is formed.

If the plastic used in the process of the invention comprises polyether sulfone 3010 E from BASF, the temperature during foaming is from 252 to 270° C., preferably from 252 to 262° C., particularly preferably from 252 to 260° C.

Variant B:

As an alternative to produce the open-cell structure, a pulverulent solid may be added together with a thermoplastic, or may be added to a mixture comprising the thermoplastic, into an inlet of an extruder. The temperature of the melt is then higher, by from 2 to 12° C., preferably from 2 to 10° C., particularly preferably from 2 to 8° C., than the temperature at which a closed-cell foam is formed. The addition of a pulverulent solid therefore generally lowers the temperature needed to form an open-cell foam without adding a pulverulent solid (variant A).

The pulverulent solid has preferably been selected from the group consisting of graphite, graphite with talc, and graphite with other fillers. Graphite is particularly preferred. The amount of the pulverulent solid generally used here is from 0.1 to 5.0% by weight, preferably from 0.2 to 4% by weight, particularly preferably from 0.5 to 4.0% by weight, based in each case on the weight of polymer. The weight of polymer is the weight of thermoplastic, or of the mixture which comprises the thermoplastic, and the weight of pulverulent solid.

If graphite with talc is used as pulverulent solid, the amount of solid in one particularly preferred embodiment is from 0.1 to 2% by weight, preferably from 0.5 to 2.0% by weight, based in each case on the weight of polymer.

Variant C:

As an alternative, at least one foreign polymer may be added together with a thermoplastic, or may be added to a mixture comprising a thermoplastic, into an inlet of an extruder, in order to bring about an open-cell structure in the foam. The foreign polymer and the plastic to be foamed are melted together. The foreign polymer is finely distributed within the plastic during the process. The blowing agent is injected into this mixture, and the polymer melt is cooled, and foams after discharge from the die. The amount of foreign polymer is with preference from 0.1 to 20% by weight, preferably from 0.2 to 10% by weight, particularly preferably from 0.2 to 5.0% by weight, based in each case on the weight of polymer. The weight of polymer is the weight of thermoplastic, or of the mixture which comprises the thermoplastic, and the weight of foreign polymer.

The foreign polymer may be any desired thermoplastic which is not miscible with the actual matrix material. Examples of suitable foreign polymers are linear low-density polyethylene (LLDPE) and polypropylene (PP).

To produce the open-cell foams of the invention, two or three of the measures described above may be combined in any desired manner (variants A-C). Variation in the foaming conditions and variation in the blowing agent formulation can moreover also vary the open-cell factor and the density of the foams obtained in the process of the invention.

Since the foams produced at an elevated foaming temperature are relatively soft and need a longer cooling time, it is preferable that the open-cell foams are produced at lower temperatures, preferably at temperatures which are substantially the same as those at which a closed-cell foam is usually produced. This is rendered possible by variant B and/or C.

In the process of the invention, the foam is formed by melting a thermoplastic, or a mixture comprising a thermoplastic, giving a melt, mixing the melt with at least one blowing agent under pressure, and foaming the melt comprising the blowing agent via extrusion into the open atmosphere (direct gas injection process). During depressurization, the blowing agent vaporizes and, by absorbing heat of evaporation, rapidly cools the melt. The freezing point of the melt simultaneously rises, because the plasticizing action of the blowing agent is lost as it evaporates. The two effects are additive, giving rapid hardening of the foam after the start of expansion.

In the process of the invention it is preferable to use blowing agents selected from the group consisting of inert gases, such as $CO_2$, nitrogen, argon; hydrocarbons, such as propane, butane, pentane, hexane; aliphatic alcohols, such as methanol, ethanol, propanol, isopropanol, butanol; aliphatic ketones, such as acetone, methyl ethyl ketone; aliphatic esters, such as methyl and ethyl acetate; chemical blowing agents; fluorinated hydrocarbons, such as 1,1,1,2-tetrafluoroethane (HFC 134a) and difluoroethane (HFC 152a); and mixtures of the abovementioned blowing agents.

Where appropriate the blowing agents are used in combination with water.

An advantage with the use of mixtures of water and blowing agent is that only small amounts of highly combustible liquids are used at the high temperatures for foaming, and the risk to safety is therefore lessened.

The amount of blowing agent used differs depending on the desired density of the foam. In one preferred embodiment of the present invention, the amount used of the blowing agent is from 0.5 to 15% by weight, preferably from 1 to 12% by weight, particularly preferably from 3 to 10% by weight, based in each case on the total weight of polymer. The total weight of polymer is the weight of the thermoplastic, or of the mixture which comprises the thermoplastic, and, where appropriate, the weight of the foreign polymer and, where appropriate, the weight of the pulverulent solid.

Where appropriate, the process of the present invention may be carried out with addition of nucleating agents and other additives. In this connection, reference is made to the appropriate explanations in the description of the foam of the invention.

One preferred embodiment of the process of the invention is depicted below:

In one preferred embodiment of the present invention, the plastic to be foamed is fed in pellet form to an extruder, e.g. a single- or twin-screw extruder, where appropriate with a pulverulent nucleating agent, and where appropriate with at least one pulverulent solid (variant B) and/or, where appropriate, with at least one foreign polymer (variant C).

The process of the invention may be carried out on a system composed of two extruders. The plastic, where appropriate with a nucleating agent, and where appropriate with at least one solid and/or, where appropriate, with at least one foreign polymer is first melted in the first extruder at a temperature above its glass transition temperature, giving a melt of the plastic, and the blowing agent is then injected under pressure into the melt and mixed homogeneously with the same, whereupon the glass transition temperature of the mixture falls. In a second extruder, the mixture is cooled to a temperature at which the viscosity of the melt remains sufficiently high to form an open-cell foam. The process may also be carried out on a system composed of one extruder. The steps described above in the process are then all carried out on one extruder.

The present invention also provides an open-cell foam obtainable by the process described above.

The open-cell foam of the invention has excellent suitability for sound deadening. The present invention therefore also provides the use of the foam of the invention for sound deadening, or for producing materials for sound deadening.

The process of the invention generally produces moldings, preferably sheets, from the open-cell plastic of the invention. To this end, the melt of the plastic is generally foamed via extrusion into the open atmosphere from a slot die, and molded in a calibrator to give sheets.

The moldings composed of the plastic of the invention have excellent suitability for sound deadening.

In the sheets preferably produced by the process of the invention from the foam of the invention, the outer layers are generally more compact than the inner regions. This higher open-cell factor causes the layers in the interior of the foam to have markedly better sound deadening properties than the outer layers of the sheet. In one particular embodiment of the present invention, therefore, sheets are produced by the inventive process described above from the open-cell foam of the invention and are divided by sawing through their centers, and the sawn surfaces (previously inner) are used for sound deadening. Naturally, it is also possible for the two half-sheets thus obtained to be joined together in such a way that the foam skins (previously the outer layer) are at the center, thus again producing a sheet with two effective sound deadening surfaces. Naturally, it is also possible to remove the two outer layers of the sheet, and thus directly obtain a sheet with two more effective sound deadening surfaces.

The present application therefore also provides a process for producing foam sheets for use in sound deadening, which comprises producing sheets composed of a foam by an inventive process described above, in particular by foaming of the melt via extrusion into the free atmosphere from a slot die and shaping in a calibrator, giving sheets with wide and narrow outer surfaces, and dividing the resultant sheets parallel to their wide surfaces, giving two portions of the sheets, each with a new inner wide surface, and, where appropriate, adhesive-bonding the two portions obtained by division of the sheets, the surfaces adhesive-bonded to one another here being those which were previously the outer wide surfaces, so that the location of the new inner wide surfaces is on the outside.

The division of the foam sheets produced by the process of the invention takes place in a manner known to the person skilled in the art, for example by sawing or cutting.

The process described above generally produces foam sheets in which the thickness of the wide surface is generally 1.5 times, preferably at least 2 times, particularly preferably at least 2.5 times, greater than the thickness of the narrow surface.

In the process of the invention, the foam sheets are divided by sawing parallel to their wide surfaces, preferably centrally.

The adhesive used to adhesive-bond the sheets in the process of the invention is an adhesive customarily used in the field of foams.

The present invention also provides a process for controlling the open-cell factor, and the density, of foams. In this process, the open-cell factor, and the density, of the resultant foams is controlled via variation of the blowing agent formulation. In this process of the invention, the melt temperature during foaming is higher by from 2 to 20° C., preferably from 2 to 12° C., particularly preferably from 2 to 10° C., than the temperatures at which a closed-cell foam is formed.

The present invention has a number of advantages over the prior art:

The process of the invention provides, for the first time, access to open-cell foams which are composed of high-temperature-resistant thermoplastics. These open-cell foams have the advantage of excellent suitability for use as sound deadening material. These foams composed of high-temperature-resistant thermoplastics can therefore replace the thermosets used hitherto as sound deadening material. Thermosets have the disadvantage that they cannot be recycled after their use. In contrast, the foams used according to the invention and composed of high-temperature-resistant thermoplastics can be recycled after their use.

Further embodiments, modifications, and variations, and also advantages, of the present invention are readily discernible and realizable by the person skilled in the art on reading the description, without exceeding the scope of the present invention.

The present invention is illustrated by the examples given, but these do not in any way restrict the invention.

EXAMPLES

The foam specimens were extruded on a tandem system. This is composed of a melting extruder and a cooling extruder.

The high-melting-point plastic and the additives are fed to the first extruder. The plastic is melted, and the blowing agent, or the mixture of blowing agents, is injected and then mixed into the melt. The melt comprising blowing agent is then cooled in the second extruder to the temperature needed for foaming. The temperature selected in the process is such that an open-cell foam is produced. After discharge from a slot die, the melt foams, and is molded in a calibrator to give sheets.

The high-melting-point plastic is polyether sulfone 3010E from BASF.

Open-cell factor was measured to DIN ISO 4590. Density was determined to DIN 53420.

Example 1

| Exp. No. | H$_2$O (%) | Acetone (%) | Talc (%) | T (° C.) | Thickness (mm) | Density (g/l) | Open-cell factor (%) |
|---|---|---|---|---|---|---|---|
| 1* | 1.2 | 4 | 0.1 | 249.1 | 30 | 43 | 6 |
| 2 | 1.2 | 4 | 0.1 | 258.3 | 25 | 53 | 78 |
| 3 | 1.8 | 4 | 0.1 | 259.2 | 28 | 46 | 93 |

*Experiment 1 is non-inventive, since the melt temperature selected here during foaming was one at which a closed-cell foam is produced (temperature difference between experiment 1 and experiments 2 and 3 approximately 10° C.).

Within a narrow temperature range, the open-cell factor increases with temperature. However, if the temperature rises above a certain value, the foam coolapses.

Example 2

The graphite is UF 2 96/97 from Kropfmuihl AG.

| Exp. No. | H$_2$O | Acetone (%) | Talc (%) | Graphite (%) | T (° C.) | Thickness (mm) | Density (g/l) | Open-cell factor (%) |
|---|---|---|---|---|---|---|---|---|
| 4 | 1.2 | 4 | 0.1 | | 258.3 | 25 | 53 | 78 |
| 5 | 1.2 | 4 | 0.5 | | 258.3 | 22 | 60 | 72 |
| 6 | 1.2 | 4 | 0.5 | | 256.1 | 27 | 47 | 84 |
| 7 | 1.2 | 4 | 1.0 | | 255.3 | 26 | 48 | 86 |
| 8 | 1.2 | 4 | | 1.0 | 254.5 | 23 | 56 | 87 |
| 9 | 1.2 | 4 | | 1.0 | 253.8 | 29 | 45 | 94 |

Open-cell factor was measured to DIN ISO 4590. Density was determined to DIN 53420.

Example 3

The PA is Ultramid B3K (nylon-6) from BASF, and the LLDPE is Lupolen 18 KFA from Basell, and the PP is Novolen 3200 MC from Basell

| Exp. No. | H$_2$O (%) | Acetone (%) | PA (%) | LLDPE (%) | PP (%) | T (° C.) | Thickness (mm) | Density (g/l) | Open-cell factor (%) |
|---|---|---|---|---|---|---|---|---|---|
| 10 | 1.2 | 4 | | | | 256.1 | 27 | 47 | 84 |
| 11 | 1.2 | 4 | 5 | | | 254.7 | 28 | 45 | 89 |
| 12 | 1.2 | 4 | | 5 | | 253.9 | 28 | 44 | 91 |
| 13 | 1.2 | 4 | | | 5 | 253.3 | 28 | 45 | 93 | all experiments used 0.5% of talc

Open-cell as measured to DIN ISO 4590. Density was determined to DIN 53420.

The sheets produced in Example 3 were divided by sawing through the center, and sound deadening to DIN 52215 was measured on the rough sawn sheets.

The table below shows the sound deadening values measured:

| Frequency (Hz) | Sound deadening (%) |
|---|---|
| 800 | 22.7 |
| 1000 | 30.8 |
| 1250 | 38.1 |
| 1600 | 51.0 |
| 2000 | 59.8 |
| 2500 | 70.4 |
| 3150 | 74.5 |
| 4000 | 80.7 |

In contrast, the following table provides information on the sound deadening properties of the non-inventive sheet from Example 1, experiment 1:

| Frequency (Hz) | Sound deadening (%) |
|---|---|
| 800 | 3.4 |
| 1000 | 3.8 |
| 1250 | 4.2 |
| 1600 | 4.7 |
| 2000 | 4.7 |
| 2500 | 5.2 |
| 3150 | 5.5 |
| 4000 | 7.1 |

We claim:

1. A foam composed of a high-temperature-resistant thermoplastic selected from the group consisting of polyether sulfones, polysulfones, polyethersulfonamides, and mixtures of these, and having an open-cell structure, wherein the open-cell factor for the foam is at least 75%, wherein the foam has a cell size of from 50 to 2000 μm, wherein cells are distributed across the entire bulk of the foam, and wherein the envelope density of the foam is lower than the envelope density of the high-temperature-resistant thermoplastic alone.

2. A foam as claimed in claim 1, wherein the plastic has a glass transition temperature above 170° C.

3. A molding, in particular a sheet, comprising an open-cell foam as claimed in claim 1.

4. A foam as claimed in claim 1, wherein the open-cell factor for the foam is at least 85%.

5. A foam as claimed in claim 1, wherein the open-cell factor for the foam is at least 90%.

6. A foam as claimed in claim 1, which has a cell size of from 100 to 1000 μm.

7. A foam as claimed in claim 1, which has a cell size of from 100 to 800 μm.

8. A foam as claimed in claim 1, which has a density of from 20 to 200 g/l.

9. A foam as claimed in claim 1, which has a density of from 20 to 150 g/l.

10. A foam as claimed in claim 1, which has a density of from 30to 100 g/l.

11. A foam as claimed in claim 1, which has a density of from 20 to 200 g/l.

12. A foam as claimed in claim 6, which has a density of from 20 to 150 g/l.

13. A foam as claimed in claim 7, which has a density of from 30 to 100 g/l.

14. A foam as claimed in claim 1, wherein the plastic has a glass transition temperature above 180°.

15. A foam as claimed in claim 1, wherein the plastic has a glass transition temperature above 200°.

16. A foam as claimed in claim 1, wherein the plastic is thermoplastically extrudable at temperatures above 280°.

17. A foam as claimed in claim 1, wherein the plastic is thermoplastically extrudable at temperatures above 300°.

18. A foam as claimed in claim 1, wherein the plastic is thermoplastically extrudable at temperatures above 320°.

19. A foam as claimed in claim 2, wherein the plastic is thermoplastically extrudable at temperatures above 280°.

20. A foam as claimed in claim 14, wherein the plastic is thermoplastically extrudable at temperatures above 300°.

21. A foam, having an open-cell structure, wherein the open-cell factor for the foam is at least 75%, obtained by extruding
    a melt comprising a high-temperature-resistant thermoplastic selected from the group consisting of polyether sulfones, polysulfones, polyethersulfonamides, and combinations thereof
    at least one blowing agent, and
    a foaming plastic comprising a cell-opener selected from the group consisting of a pulverulent solid, a foreign polymer, and combinations thereof,
    into the open atmosphere at a temperature higher by from 2 to 12° C. than the temperature at which a closed-cell foam of the thermoplastic, which is foamed, is formed.

* * * * *